Dec. 1, 1964  C. E. PLYMALE  3,159,693
METHOD OF FORMING PLASTIC ARTICLES
Filed Dec. 1, 1961

INVENTOR.
CHARLES E. PLYMALE
BY
Claron N. White and W. A. Schaich
ATTORNEYS 3,159,693
METHOD OF FORMING PLASTIC ARTICLES
Charles E. Plymale, Maumee, Ohio, assignor to Owens-Illinois Glass Company, a corporation of Ohio
Filed Dec. 1, 1961, Ser. No. 156,295
5 Claims. (Cl. 264—53)

This invention relates to an improved method of forming articles from expandable plastic sheets.

It is well known in the art to mold an article from a plastic sheet by first placing a heated sheet in a mold and thereafter applying a vacuum to one side of the sheet whereby the sheet is caused to conform to the shape of the mold. Illustrative of such processes is U.S. Patent No. 1,737,874. In addition mechanical assists can be employed with the aforementioned method whereby deep or complex draws are involved. However, the forming of a cellular polystyrene sheet by the foregoing methods has proven very difficult since the cellular sheet becomes very fragile when heated to the temperature at which it is to formed or molded. For example, if a cellular polystyrene sheet of 9 pounds per cubic foot density is heated and formed in a conventional plastic molding apparatus, the preheating of the plastic sheet prior to its introduction in the mold must be controlled very precisely; otherwise the sheet will expand before it can be placed into the mold where it is to be shaped. If the sheet expands to a lower density, the physical strength of the sheet is markedly reduced such that only shallow draw articles can be formed in the subsequent molding step. Of course, if deep draw articles are attempted, the plastic sheet is ruptured during the molding step.

It is therefore an object of this invention to provide a novel process for molding and drawing expandable plastic sheets.

A further object of this invention is to provide a novel process of heating, shaping and drawing expandable plastic sheets into plastic articles which are free of defects.

A further object of this invention is to provide a novel process of forming plastic articles from expandable polystyrene by means of heating, differential pressures and molding.

These and other objects of this invention will be apparent from the description which follows.

The novel process of this invention for molding cellular plastic articles comprises heating an expandable plastic sheet, such as polystyrene, to its formable temperature or to a softened condition suitable for molding while maintaining the sheet under such pressure as to prevent its expansion, and thereafter permitting the sheet to expand after it has been molded into its final desired shape or configuration. More specifically, the method of the present invention forms a plastic article from a sheet of expandable plastic containing a foaming agent and the method comprises:

(1) Engaging the two major surfaces of the sheet at the periphery of a portion of the sheet by cavity-containing mold members so that each major surface within that periphery faces a cavity;

(2) Introducing a fluid into each cavity to provide equal pressures against both surfaces within that periphery greater than the pressure to be imparted by the foaming agent at a subsequent forming temperature;

(3) Heating the sheet within the periphery of that portion to a forming temperature while maintaining fluid pressures against both surfaces greater than that of the foaming agent;

(4) Distorting the heated sheet within said periphery while maintaining the fluid pressures above that of the foaming agent until one major surface abuts a concave mold surface of one of the mold members to form a shaped article;

(5) Reducing the fluid pressures on the major surfaces to a pressure less than that provided by the foaming agent at the forming temperature while maintaining the one major surface of the shaped article in contact with the mold surface; and (6) Reducing the fluid pressure on the major surfaces to that of the atmosphere with the shaped article in contact with the mold surface.

The invention will become more apparent from the following detailed description of a preferred embodiment of the invention taken in conjunction with the accompanying drawings in which.

Figure 2:
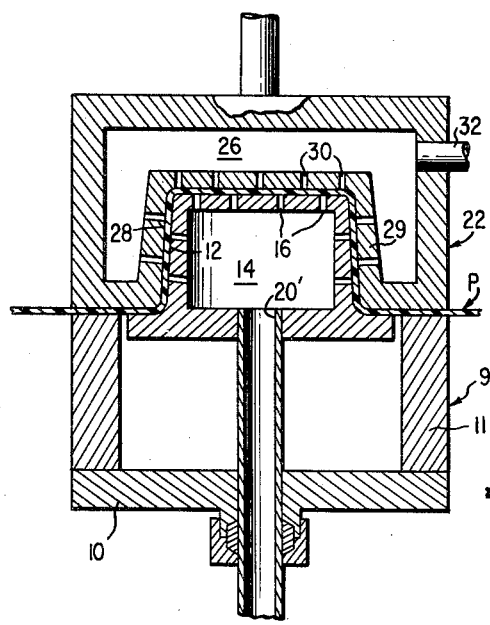
FIG. 2 is similar to FIG. 1 but illustrates a later stage in the molding of an expandable plastic sheet.
Figure 1:
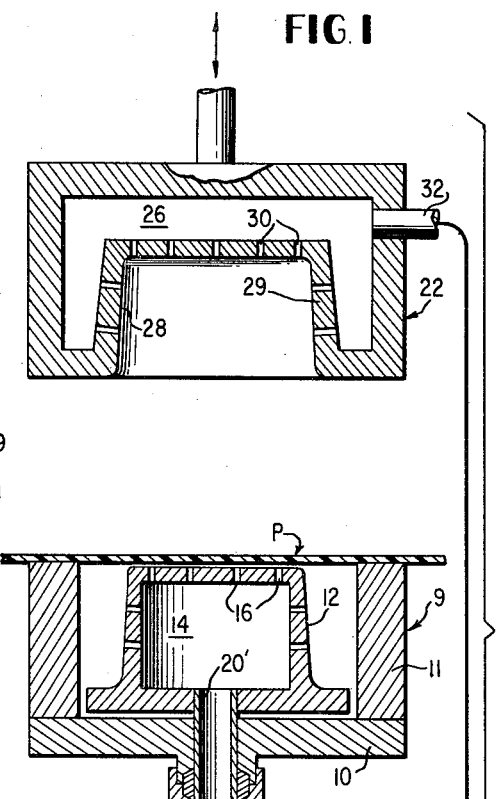
FIG. 1 is a sectional view of an apparatus which can be utilized to practice the novel process of this invention.

With particular reference to FIG. 1 there is shown an expandable plastic sheet P positioned on a cavity-containing mold member generally indicated at 9 including a lower plate 10 and a sidewall 11 of a molding apparatus. Located within the cavity of mold member 9 is a movable mold assist plug 12 which has an interior cavity 14. There are drilled openings 16 in plug 12. The plug 12 is mounted on a piston 18 which extends through plate 10 and which is moved vertically to raise or lower plug 12 by a prime mover (not shown). The piston 18 has a channel 20 for the introduction of steam from a steam source to cavity 14 and thus to the cavity of mold member 9. The entry of the steam is controlled by means of a valve 17. An upper cavity-containing mold member generally indicated at 22 is supported by a piston 24 which is moved vertically by a prime mover (not shown). The upper mold member 22 has a double wall constructed to provide a steam chest 26 which communicates with the inner surface 28 of female or concave mold portion 29 of mold member 22 by means of openings 30. Steam is supplied to chest 26 from the steam source by a conduit 32 under controlled pressure by means of a valve 34.

The manner in which the above apparatus is employed in the novel process of this invention is as follows:

A sheet P of expandable cellular polystyrene having a density of ten pounds per cubic foot is placed on mold member 9 as shown in FIG. 1. This sheet differs from the customary commercially available expandable polystyrene sheet in that the blowing or foaming agent is n-heptane instead of n-pentane. The mold members 9 and 22 are then brought together so that the two major surfaces of sheet P are engaged at the periphery of the sheet. When the sheet is quite large and several mold apparatuses are to be used for the simultaneous formation of a number of acticles from the one sheet, the mold members 9 and 22 of each apparatus are brought together to engage the two major surfaces of sheet P at the periphery of a portion of the sheet. In each case the cavity-containing mold members 9 and 22 of an apparatus engage the periphery of the portion of the sheet so that each major surface within that periphery faces a cavity. After members 9 and 22 are thus brought together, steam under 20–100 p.s.i.g. is introduced into the cavity 14 and thus the cavity of mold member 9 and into chest 26 and thus the cavity of mold member 22. The valves 17 and 34 are adjusted so that the steam pressure on each side of sheet P is the same. The steam heats sheet P and the temperature of the latter reaches its forming temperature (180°–230° F.) in about 2–5 seconds. The n-heptane in sheet P has a vapor pressure at this temperature of less than 15 p.s.i.g. As a result there is no expansion of sheet P at this time.

Figure 3:
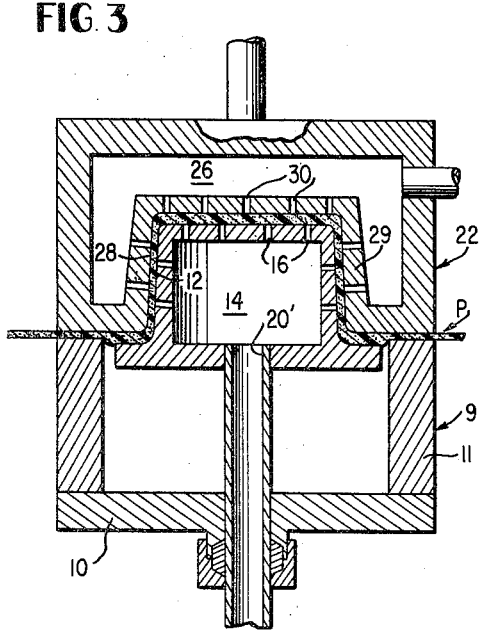
FIG. 3 is similar to FIG. 2 but illustrates the final stage in the molding of an expandable plastic sheet.

The steam pressure in chest 26 is then reduced so that the pressure in chest 26 is less than the pressure in the cavity of mold member 9 but not below the vapor pressure of n-heptane in sheet P. As a result of this pressure differential for the two cavities of mold members 9 and 22, sheet P is forced upwardly or distorted until the heated sheet P abuts surface 28 of the female mold portion 29. Instead of distorting the sheet by this pressure differential or as supplementary to this pressure differential for a deep draw of sheet P plug 12 can be raised to provide a mechanical pressure to distort this portion of sheet P or to assist in this distortion so that this portion of sheet P abuts the surface 28 of mold portion 29 of mold member 22. After the article is thus formed or shaped, plug 12 is lowered or retracted a predetermined distance and the steam pressure in both cavities is reduced simultaneously until the steam pressure on both sides of sheet P is less than the vapor pressure of the n-heptane. As a result this portion of sheet P expands to fill the space between plug 12 and mold portion 29. The plug 12 in its retracted position with mold members 9 and 12 still engaged in position against sheet P is shown in FIG. 3. The amount of expansion of the shaped portion of sheet P can be controlled by the distance that plug 12 is retracted. Of course, there is a maximum distance to which plug 12 should be retracted and this distance is determined by the maximum expansibility of the plastic material that is being used.

When plug 12 is used the steam pressure in both cavities can be completely eliminated after the article is formed because retracted plug 12 during the expansion of the plastic will insure that the shaped article will be maintained in abutment with the female mold portion 29. As a result, the shaped article can be ejected immediately after the forming and expansion or immediately after the expansion following the forming operation because the blowing or foaming agent, namely n-heptane, has a substantial heat of vaporizaiton. The heat necessary for effecting this vaporization of n-heptane comes from the polystyrene foam matrix that constitutes sheet P. Because of this substantial heat of vaporization of n-heptane, the shaped article of expanded or foamed polystyrene is rapidly cooled and thus can be removed immediately from the mold apparatus upon completion or expansion of the shaped article. This is in contrast to conventional polystyrene molding operations which require a separate cooling cycle before the formed or shaped article can be removed from a mold apparatus.

Of course the trimming of the finished molded article can be performed in part during the molding operation, and the removal of any residual flash can be completed upon removal of the article from the mold.

When shallow draw articles are to be made by the process of the present invention it is not necessary to use assist plug 12. In such an embodiment the mold members 9 and 22 are brought together into engagement with sheet P so that the cavities of these mold members face the two major surfaces of sheet P within the periphery of sheet P that is abutted by mold members 9 and 22. As in the previous embodiment, steam is introduced into the cavity of mold member 9 and steam chest 26 in order to provide steam pressure against the two major surfaces of sheet P that are at least equal to the vapor pressure of n-heptane in sheet P when the latter is at the temperature of the steam. This will prevent expansion of sheet P until a later phase of the operation. Although the steam pressures in the two cavities are greater than that of n-heptane in the heated sheet that results from the introduction of steam, the steam pressure in these two cavities are different. The steam pressure in the cavity of mold member 9 is greater than that in the cavity of mold member 22 so that the pressure differential distorts the heated sheet P until the latter is drawn into abutment with the female mold portion 29 of mold member 22.

If it is decided to utilize gravity to assist in the distortion or shaping of sheet P until it conforms with the surface 28 of female mold portion 29 of mold member 22 the molding apparatus can be used in an inverted position compared with that shown in FIG. 1.

As mentioned above, the steam pressure in each cavity, i.e., on each side of sheet P, must be in excess of the vapor pressure of the foaming agent in sheet P at its forming temperature as provided by heat transfer from the steam. These steam pressures prevent expansion of sheet P during the heating and during the distortion of shaping of sheet P to the article to be produced. After the sheet P has been drawn or distorted into abutment with female surface 28, the plastic of the shaped article is expanded by reducing the steam pressure on each side of the article. This reduction of the steam pressure on each side of the shaped article is gradual. This reduction of pressures is uniform so that the pressure differential is maintained to insure that the shaped plastic article remains in abutment with female surface 28 of mold member 22. This reduction of steam pressure is provided until the steam pressures are below the vapor pressure of n-heptane in the heated plastic shaped article. Although the temperature of the plastic article is its forming temperature this vapor pressure of n-heptane is less than 15 p.s.i.g. Under these conditions the reduction of pressures in each cavity results in the foaming of the shaped plastic article while it remains in abutment with female surface 28. This maintenance of relative differential in steam pressure is important, because plug 12 is not used in this embodiment to maintain the shaped plastic article in abutment with the female mold surface 28 during the expansion.

The manufacture of an expandable plastic sheet P, such as polystyrene, for use in the present process is well known in the art. According to one process (U.S. Patent No. 2,450,436), foamable plastic materials containing a liquid foaming or blowing agent are fed into one end of an extruder and the foamable plastic is extruded from a circular orifice. Thereafter the resulting tubular material is slit so as to form a flat sheet.

Figure 4:
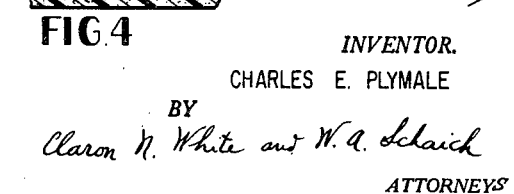
FIG. 4 is an enlarged sectional detail view of a portion of the wall of the article formed in FIG. 3.

From the foregoing description it will be apparent that there has been described a novel process of molding an article from a foamable or expandable plastic by first shaping the sheet to the desired shape or contour without causing further expansion of the sheet by employing controlled heat and pressure. Under such circumstances there is formed a cellular plastic article whose strength has not been diminished due to attempts to expand and shape the sheet simultaneously during the molding of the finished article. Moreover, it will be observed that the articles formed by the present process have a uniform cellular construction (FIG. 4) due to the manner in which the foamable plastic sheet is expanded after the sheet has been formed into the general contour of the finished article.

Although in the embodiments of the invention described above, a foamable or expandable plastic sheet having a density of ten pounds per cubic foot was employed, the process is equally applicable to an expandable plastic sheet, such as polystyrene, whose density varies from 7–20 pounds per cubic foot. In addition, expandable plastic sheet material other than polystyrene can be used in the present process. Moreover, various liquid foaming agents can be used other than n-heptane provided the steam pressure applied to the plastic sheet during shaping is in excess of the vapor pressure of the foaming or blowing agent. For example, if the blowing agent had a vapor pressure of 35 p.s.i.g., the steam pressure in chest 26 could be 40 p.s.i.g., while in cavity 14 it would be in excess of 40 p.s.i.g. thereby insuring that the plastic sheet will not only conform to mold surface 28, but that the applied steam pressures on each side of the plastic sheet are such as to prevent its expansion before the sheet has assumed its desired final configuration.

The control of steam pressure is a well known technique and in the present invention is effected by valves 17 and 34. The steam pressure is released simultaneously on both sides of the sheet and at the same rate which results in an expansion of the sheet in the mold without displacement. In those instances where the assist plug 12 is eliminated completely, the steam would be permitted to discharge through openings (not shown) which would be provided in the upper part 20' of channel 20 as will be apparent to those skilled in the art. Under such circumstances the cavity of member 9 would constitute a steam chest in contact with sheet P comparable to cavity 14.

It is to be understood that the number of openings 16 in plug 12 whereby the steam in cavity 14 is brought into contact with plastic sheet P is merely by way of example and may be increased or decreased in number depending upon the characteristics of sheet P. In general, the number of openings will be increased where thicker and more dense sheets of plastic P are employed. The foregoing observation also applies to the number of openings 30 in mold 29 whereby the steam in chest 26 is brought into contact with the other side of plastic sheet P.

Although a simple article in the nature of a container has been used to illustrate the process of this invention, it is apparent that articles of varying and more complex contour can be made depending upon the configuration of the female mold portion and assist plug such that the finished article may have one or more plane, convex and concave surfaces. In some instances it may prove advantageous to use heated gases other than steam. By way of example, heated air, oxygen or nitrogen may be employed. Under other circumstances, heated heavy unreactive organic gases or vapors may be used. Of course, instead of using gas pressure liquid pressure may be used in carrying out the process of the present invention, because the use of pressure of fluid, either gas or liquid is contemplated. Furthermore, the fluid pressure can be applied to the major surfaces of sheet P separately to the heating of the sheet. In such case, the sheet is heated by other than the fluid, e.g., the sheet can be heated by dielectric means.

Instead of using a foaming agent that vaporizes to expand the plastic, an agent that sublimes to accomplish this expansion can be used. In such case, the heat of sublimation accelerates cooling of the shaped article.

While I have described and illustrated preferred embodiments of my invention, I wish it to be understood that I do not intend to be restricted solely thereto, but that I do intend to cover all modifications thereof which would be apparent to one skilled in the art and which come within the spirit and scope of my invention.

What I claim is:

1. A method of forming a plastic article from a sheet of expandable plastic containing a foaming agent which comprises:
   (1) engaging the two major surfaces of the sheet at the periphery of a portion of the sheet by cavity-containing mold members so that each major surface within that periphery faces a cavity;
   (2) introducing a fluid into each cavity to provide equal pressures against both surfaces within that periphery greater than the pressure to be imparted by the foaming agent at a subsequent forming temperature;
   (3) heating the sheet within the periphery of that portion to a forming temperature while maintaining fluid pressures against both surfaces greater than that of the foaming agent;
   (4) forming the heated sheet within said periphery while maintaining different superatmospheric fluid pressures against both surfaces above that of the foaming agent until one major surface abuts a concave mold surface of one of the mold members to form a shaped article;
   (5) reducing the fluid pressures on the major surfaces to a pressure less than that provided by the foaming agent at the forming temperature while maintaining the one major surface of the shaped article in contact with the mold surface; and
   (6) reducing the fluid pressure on the major surfaces to that of the atmosphere with the shaped article in contact with the mold surface.

2. The method of claim 1 in which the plastic is polystyrene, the foaming material is n-heptane, and the fluid is steam.

3. The method of claim 2 in which the distorting of the heated sheet is provided at least in part by mechanical pressure supplied by a mold plug.

4. A method of forming a plastic article from a sheet of expandable plastic containing a foaming agent which comprises:
   (1) engaging the two major surfaces of the sheet at its periphery by cavity-containing mold members so that each major surface within that periphery faces a cavity;
   (2) introducing steam into each activity to provide steam pressure against both surfaces of the sheet greater than the pressure of the foaming agent at the steam temperature which heats the sheet to that temperature.
   (3) distorting the heated plastic sheet within the periphery by means of mechanical pressure using a mold plug while maintaining superatmospheric steam pressures above that of the foaming agent until one major surface abuts a concave mold surface of one of the mold members to form a shaped article;
   (4) retracting the mold plug a predetermined distance;
   (5) reducing the steam pressure in the mold cavities to pressure less than the vapor pressure of the foaming agent at the forming temperature of the plastic with the retracted plug at the predetermined position to provide expansion of the shaped article while maintaining contact of the article with a concave mold surface.
   (6) removing the expanded shaped article from the cavity-containing mold members.

5. The method of claim 4 in which the plastic is polystyrene and in which the foaming agent is n-heptane.

References Cited in the file of this patent

UNITED STATES PATENTS

| 2,751,627 | Lindemann | June 26, 1956 |
| 2,942,301 | Price et al. | June 28, 1960 |
| 2,983,955 | Gajdosik | May 16, 1961 |
| 3,042,972 | Lafferty | July 10, 1962 |
| 3,044,122 | Webb et al. | July 17, 1962 |